US011535156B2

(12) United States Patent
Arndt et al.

(10) Patent No.: US 11,535,156 B2
(45) Date of Patent: Dec. 27, 2022

(54) APPARATUS FOR MONITORING THE BLIND SPOT OF A MOTOR VEHICLE

(71) Applicant: FORD GLOBAL TECHNOLOGIES, LLC, Dearborn, MI (US)

(72) Inventors: Christoph Arndt, Rheinland-Pfalz (DE); Uwe Gussen, Huertgenwald (DE); Frederic Stefan, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 1063 days.

(21) Appl. No.: 16/206,533

(22) Filed: Nov. 30, 2018

(65) Prior Publication Data
US 2019/0202358 A1 Jul. 4, 2019

(30) Foreign Application Priority Data
Jan. 3, 2018 (DE) ...................... 10 2018 200 054.9

(51) Int. Cl.
B60R 1/00 (2022.01)
B60Q 9/00 (2006.01)
B60R 1/12 (2006.01)
B60R 1/08 (2006.01)
B60R 1/072 (2006.01)

(52) U.S. Cl.
CPC ............. B60R 1/007 (2013.01); B60Q 9/008 (2013.01); B60R 1/08 (2013.01); B60R 1/12 (2013.01); B60R 1/1207 (2013.01); B60R 1/072 (2013.01); B60R 2001/1215 (2013.01); B60R 2001/1223 (2013.01); B60R 2300/101 (2013.01); B60R 2300/105 (2013.01); B60R 2300/301 (2013.01); B60R 2300/8026 (2013.01); B60R 2300/8066 (2013.01)

(58) Field of Classification Search
CPC ... B60R 1/007; B60R 1/12; B60R 2001/1276; B60R 1/072; B60R 1/08; B60R 1/081; B60R 1/1207; B60R 2001/1223; B60R 2300/8026; B60R 2300/8066; B60Q 9/008
USPC ................................ 359/841, 855, 865, 843
See application file for complete search history.

(56) References Cited

U.S. PATENT DOCUMENTS 2,017,122 A * 10/1935 Hanson ................... H04R 1/342
381/160
2,228,024 A * 1/1941 Abrahams .............. G10K 11/28
343/837

(Continued)

FOREIGN PATENT DOCUMENTS

EP 407638 A1 1/1991
WO 9633479 A1 10/1996
WO 2005015260 A1 2/2005

OTHER PUBLICATIONS

Paetsch, Martin. Eavesdropping: Flying has better ears. Spiegel Online. Thursday, May 4, 2001. 4 pages.

(Continued)

Primary Examiner — Ricky D Shafer
(74) Attorney, Agent, or Firm — Brooks Kushman P.C.; Frank Lollo

(57) ABSTRACT

An apparatus for monitoring the blind spot of a motor vehicle has a mirror assembly with at least one mirror element that can be moved using an actuator, and a microphone assembly. The microphone assembly is designed to determine the sound direction, and the movable mirror element is in the form of a sound reflector.

20 Claims, 2 Drawing Sheets

(56) References Cited

U.S. PATENT DOCUMENTS

| | | | | |
|---|---|---|---|---|
| 3,180,219 | A * | 4/1965 | Ruiz | B60R 1/081 359/865 |
| 3,977,774 | A | 8/1976 | O'Sullivan | |
| 4,159,866 | A * | 7/1979 | Wunsch | B60R 1/025 359/876 |
| 5,052,792 | A * | 10/1991 | McDonough | B60R 1/025 359/846 |
| 5,306,953 | A * | 4/1994 | Weiner | G01S 15/931 359/604 |
| 6,550,332 | B2 * | 4/2003 | Lee | G01H 3/12 73/147 |
| 7,216,993 | B2 | 5/2007 | Murray | |
| 7,354,166 | B2 * | 4/2008 | Qualich | B60R 1/081 359/877 |
| 8,626,468 | B2 | 1/2014 | Luft et al. | |
| 9,409,518 | B2 * | 8/2016 | Sala | B60R 1/072 |
| 9,434,383 | B2 | 9/2016 | Kim et al. | |
| 2004/0252389 | A1 * | 12/2004 | Suggs | B60R 1/025 340/425.5 |
| 2008/0169938 | A1 * | 7/2008 | Madau | B60R 1/12 340/901 |
| 2010/0007974 | A1 | 1/2010 | Chuang | |
| 2013/0176145 | A1 | 7/2013 | Yu | |
| 2013/0336093 | A1 | 12/2013 | Suvanto | |
| 2017/0101058 | A1 * | 4/2017 | Park | B60R 1/072 |
| 2018/0194287 | A1 * | 7/2018 | Arndt | B60R 1/081 |

OTHER PUBLICATIONS

Böddeker Michael. How to hear flies. Deutchlanradio. Oct. 22, 2008. 3 pages.

Pluta, Werner. Usound builds Mems speaker for headphones. Golem. de IT—News Fur Profis. Feb. 1, 2017. 3 pages.

Mattke, Sascha. Schott: In a few years there could be glass for wrinkles, heise online. Sep. 3, 2016. 5 pages.

Schumacher, Thomas. MEMS Microphone Array Sensor for Air-Coupled Impact-Echo. US National Library of Medicine National Institutes of Health. Jun. 25, 2015. 18 pages.

Turqueti, Marcos et al. Smart Acoustic Sensor Array (SASA) System for Real-time Sound Processing Applications. Ilinois Institute of Technology. Aug. 13, 2012. 38 pages.

* cited by examiner

APPARATUS FOR MONITORING THE BLIND SPOT OF A MOTOR VEHICLE

CROSS-REFERENCE TO RELATED APPLICATIONS

This application claims foreign priority benefits under 35 U.S.C. § 119(a)-(d) to DE Application 10 2018 200 054.9 filed Jan. 3, 2018, which is hereby incorporated by reference in its entirety.

TECHNICAL FIELD

Various embodiments relate to an apparatus for monitoring the blind spot of a motor vehicle, a blind spot assistant having such an apparatus, and to a motor vehicle having such a blind spot assistant.

BACKGROUND

Blind spot assistants (also lane change assistants) are driver assistance systems for warning a motor vehicle driver of imminent collisions in the event of a lane change. Ultrasonic sensors, radar sensors, cameras or laser scanners can be used to capture road users or other vehicles approaching in the neighboring lane. Warning messages for the motor vehicle driver may be provided in different ways depending on whether or not the direction indicator ("turn signal") has been actuated.

A visual warning, at most, may be provided to the driver if a turn signal has not been actuated. However, if the turn signal is active, a higher warning level may be activated and provided to the driver, in the case of which the warning is given in a more urgent manner, usually visually by means of quickly flashing light indicators, usually in the region of the exterior mirrors, audibly by means of warning tones and/or haptically by means of vibration of the steering wheel, the driver's seat surface or the turn signal lever.

Radar sensors may be used to capture road users in the blind spot of a rearview mirror of a motor vehicle. However, the use of radar sensors requires electromagnetic waves to be transmitted and reflected at accordingly suitable. Reflections at guardrails, for example, may be disruptive.

Therefore, there is a need to show ways of being able to improve the accuracy when capturing road users in the blind spot of a vehicle.

SUMMARY

Various embodiments according to the present disclosure provide for an apparatus for monitoring the blind spot of a motor vehicle, the apparatus having a mirror assembly with at least one mirror element which can be moved using an actuator, and a microphone assembly. The microphone assembly is designed to determine the sound direction, and the movable mirror element is in the form of a sound reflector.

In addition to other sensor signals, sound emissions emitted by or originating from other road users in the blind spot are therefore detected and captured. A road user may be another vehicle emitting sound such as road surface, tire, engine, transmission, aerodynamic, and braking noise, or other audible sound. In further examples, a road user may be a pedestrian, bicyclist, or the like that is emitting sound. These sensor signals are combined with other data by means of sensor data merging in order to thus improve the accuracy with which road users in the blind spot are captured. In this case, the mirror element of the apparatus is used to deflect or reflect sound in the desired manner to the microphone assembly. For example, in response to an activated turn signal, provision may be made for the movable mirror element to be changed using the actuator to a position in which sound emitted by a road user in the blind spot is deflected or reflected to the microphone assembly.

According to one embodiment, the mirror assembly has at least one stationary mirror element. The original functionality of a rearview or sideview mirror of a motor vehicle, specifically that of making it easier for a motor vehicle driver to observe the traffic situation behind, is therefore retained, while the movable mirror is used to detect road users in the blind spot.

According to another embodiment, the movable mirror element and the stationary mirror element are connected to one another in a foldable manner. The movable mirror element and the stationary mirror element are therefore foldably connected to one another along a pivot axis and are simultaneously formed in one piece, e.g. as a foldable mirror sheet. Therefore, the mirror surface, formed from the movable mirror element and the stationary mirror element, has a gap-free or continuous design which makes it particularly easier for a motor vehicle driver to observe the traffic situation behind, and provides a larger mirror surface when the movable mirror element is not folded, or is co-planar with the stationary element. The movable mirror element is moveable relative to the stationary mirror element; however, it is envisioned that the stationary mirror element may be positioned relative to the vehicle by the driver to provide for the appropriate rear viewing or side viewing angles as is known in the art.

According to another embodiment, the sound reflector has, in at least one direction of extent, a dimension which has at least five times the sound wavelength. In one example, the sound wavelength is associated with an audible noise, and lies within a range of 20 Hertz to 20,000 Hertz. In further examples, the sound wavelength lies within a range defined as 3,000-20,000 Hertz, or in a further example, lies within a range defined by 5,000-20,000 Hertz, or in an even further example, lies within a range defined by 10,000-20,000 Hertz. In even further examples, the sound wavelength may be greater than 20,000 Hertz. Note that length in meters of a wavelength decreases with increasing Hertz, and the length of a wavelength may be calculated from the frequency using the speed of sound in air at a temperature of 20 degrees Celsius, or 343 meters per second. This ensures particularly efficient deflection or reflection of sound emissions from a road user in the blind spot.

According to another embodiment, the microphone assembly has a plurality of microphones. The microphones are arranged at a minimum distance of greater than zero from one another such that they are spaced apart from one another and, by measuring the sound propagation time difference, allow the direction from which sound originates to be determined. It is therefore possible to dispense with directional microphones, such that the microphone assembly contains omnidirectional microphones.

According to another embodiment, microphone assembly is a Micro-Electro-Mechanical Systems (MEMS) microphone assembly. In this case, the MEMS microphone assembly is understood as meaning a microsystem, the components of which have the smallest dimensions on the order of one micrometer and interact as a system. The microphones in the MEMS microphone assembly may be condenser microphones in microsystems technology (MEMS microphone) in which the microdiaphragm which changes electrical capacitance is etched directly onto the silicon wafer. If the read-out electronics have a preamplifier and an analog/digital converter and are integrated directly beside the diaphragm on the wafer in an application-specific integrated circuit (ASIC) (e.g. as components in complementary metal-oxide semiconductor (CMOS) technology) such that the microphone has a digital output, such devices may also referred to as digital microphones. They have small dimensions, a low power consumption and good shielding with respect to interference signals and can be produced in a cost-effective manner.

DETAILED DESCRIPTION

As required, detailed embodiments of the present disclosure are provided herein; however, it is to be understood that the disclosed embodiments are merely examples and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
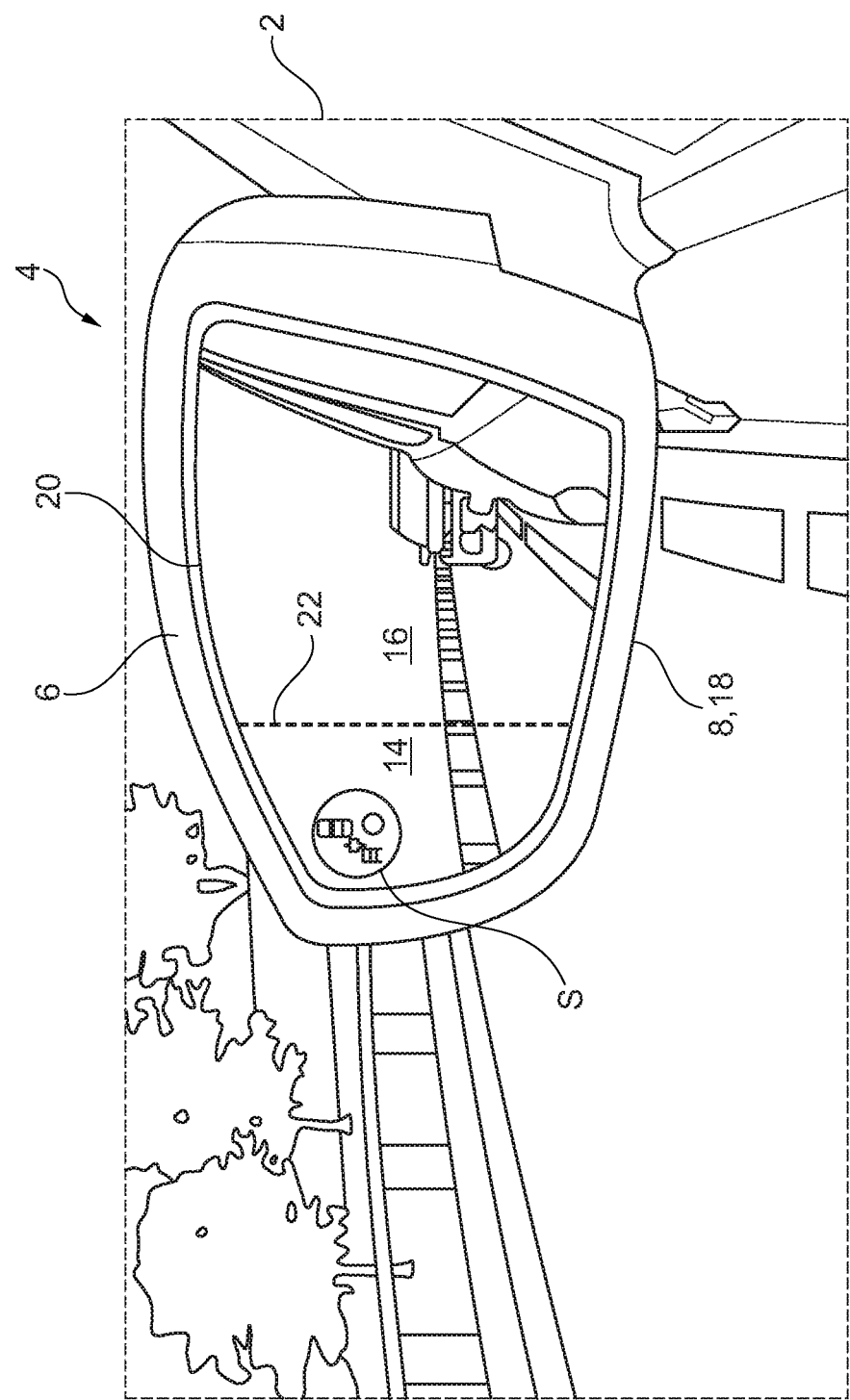
FIG. 1 shows a schematic illustration of a motor vehicle having a blind spot assistant.

FIG. 1 illustrates a vehicle exterior mirror 18 of a motor vehicle 2 according to an embodiment. The motor vehicle 2 has a blind spot assistant 4 having an apparatus 6 for monitoring the blind spot of the motor vehicle 2, with which a blind spot of the vehicle exterior mirror 18 can be monitored. In this case, the blind spot is understood as meaning an area or region which cannot be seen by a motor vehicle driver by looking in the vehicle exterior mirror 18.

In the present embodiment, the blind spot assistant 4 is designed to project a flashing light signal, as a visual warning signal, in the form of a symbol S onto a mirror surface 20 of a mirror assembly 8 of the vehicle exterior mirror 18 in response to a road user in the blind spot being captured by the apparatus.

In the present embodiment, the mirror assembly 8 has a movable mirror element 14 and a stationary mirror element 16. In this case, the movable mirror element 14 and the stationary mirror element 16 are connected to one another in a foldable manner. In other words, the mirror surface 20 is produced from foldable glass. In the present embodiment, the movable mirror element 14 and the stationary mirror element 16 are therefore connected to one another along a pivot axis 22 and are simultaneously designed in one piece and without a gap, such that the movable mirror element and the stationary mirror element form a continuous mirror surface.

Figure 2:
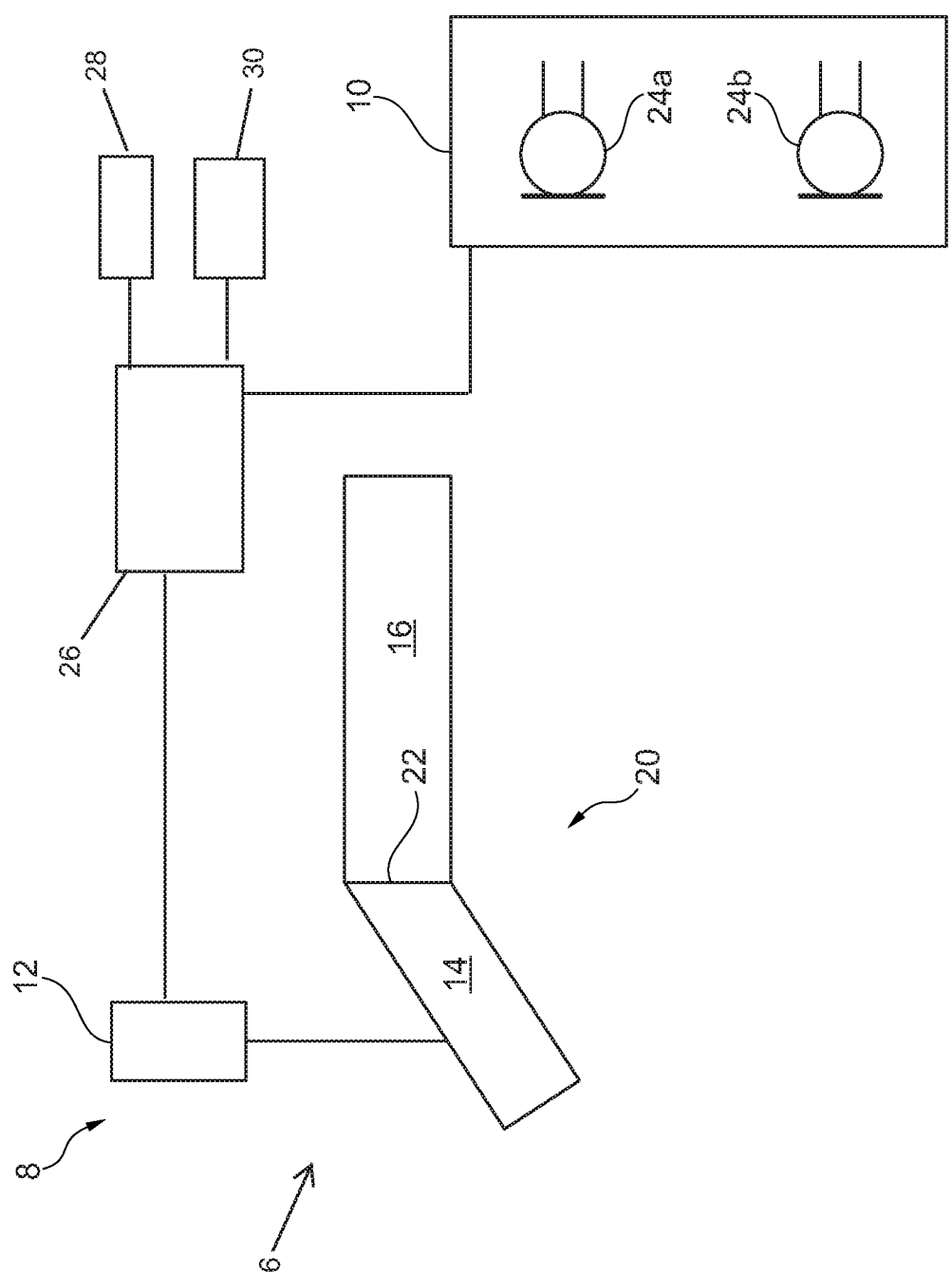
FIG. 2 shows further details and components of the blind spot assistant illustrated in FIG. 1.

FIG. 2 illustrates a schematic of the apparatus 6. The mirror assembly 8 has an actuator 12, for example a piezo actuator, for moving the movable mirror element 14 about the pivot axis 22 and relative to the stationary mirror element 16.

In a first, starting position, the movable mirror element 14 and the stationary mirror element 16 are co-planar such that they form a flat mirror surface 20 without a gap-shaped transition between the movable mirror element 14 and the stationary mirror element 16 (as shown in FIG. 1). In a second, deflection position, and as shown in FIG. 2, the movable mirror element 14 is moved by actuating the actuator 12 to move the movable mirror element 14 relative to the stationary mirror element 16.

The apparatus for monitoring the blind spot 6 also has a microphone assembly 10. In order to determine the sound direction, the microphone assembly 10 has a plurality of microphones. In the present example, the microphone assembly 10 has a first microphone 24a and a second microphone 24b which are arranged at a minimum distance of greater than zero from one another, or are spaced apart from one another. The microphone assembly is mounted to the vehicle.

According to an example, the first microphone 24a and the second microphone 24b are MEMS microphones. These are, for example, condenser microphones having a silicon diaphragm arranged on a carrier, such as a processed silicon wafer. For example, the silicon diaphragm can be produced using surface micromechanics and further components may be provided for signal processing. In this case, surface micromechanics are understood as meaning the fact that mechanical structures are formed on a wafer surface by means of a plurality of etching and deposition operations. The particular advantage of this technology is that the micromechanical structures can be combined together with electrical circuits on a microchip.

In other words, the microphone assembly 10 is a microsystem on a chip with integrated circuits or signal processing and sensors for capturing sound in the form of the first microphone 24a and the second microphone 24b. In other examples, the microphone assembly 10 having the first microphone 24a and the second microphone 24b may also be produced using other manufacturing technologies, for example, via silicon bulk mechanics or from plastic components which are applied to a carrier, e.g. via three-dimensional (3-D) printing. In this case, silicon bulk mechanics are understood as meaning that freestanding mechanical structures are obtained from a silicon wafer by means of etching on one or both sides. They are produced by etching silicon in alkaline solutions (e.g. potassium hydroxide solution) in a manner dependent on the crystal orientation; this process may be referred to as anisotropic wet etching.

In contrast, 3-D printing is understood as meaning generative production methods in which workpieces are constructed in layers.

During operation, for example in response to an activated turn signal, the movable mirror element 14 is changed to the position illustrated in FIG. 2 by actuating the actuator 12. Sound emitted by a road user in the blind spot is then deflected to the microphone assembly 10, wherein a measurement of the sound propagation time difference using the first microphone 24a and the second microphone 24b is used to determine the direction from which sound originates. These sensor signals are combined with other data by means of sensor data merging.

A controller 26 is provided, and may be a part of a vehicle control system. The controller 26 is connected to the actuator 12 to control the movable mirror element 14 position. The controller 26 receives signals from the microphones in the microphone assembly 10, for example, as discrete signals from each microphone. The controller 26 is connected to other vehicle systems, such as the turn indicator system 30 to indicate that a lane change may be imminent, or to otherwise cause the controller to change the movable mirror to the deflected position. The controller is configured to, in response to receiving an input indicative of an imminent lane change or other input to monitor the blind spot, control the movable mirror element to the deflected position such that sound emitted by and originating from a road user in the vehicle blond spot is deflected to the microphone assembly. The controller uses data received from the microphones 24a, 24b in the microphone assembly to measure the sound propagation time difference using the first microphone 24a and the second microphone 24b, and determine a direction from which sound originates and if a road user is present in the blind spot. In the event of a road user being present in the blind spot of the vehicle, the controller activates the warning system 28 to alert the vehicle driver of a road user in the blind spot.

It is thus possible to improve the accuracy when capturing road users in the blind spot.

LIST OF REFERENCE SYMBOLS

2 Motor vehicle
4 Blind spot assistant
5 Apparatus for monitoring the blind spot
8 Mirror assembly
10 Microphone assembly
12 Actuator
14 Movable mirror element
16 Stationary mirror element
18 Vehicle exterior mirror
20 Mirror surface
22 Pivot axis
24a Microphone
24b Microphone
26 Controller
28 Warning System
30 Turn Indicator System
S Symbol While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. An apparatus for monitoring a blind spot of a motor vehicle, the apparatus comprising:
   a mirror assembly with a first mirror element, and a second movable mirror element in a form of a sound reflector, wherein the second movable mirror element is movable from a first position to a second position, the first mirror element and the second movable mirror element forming a co-planar mirror surface with the second movable mirror element in the first position;
   an actuator to move the second movable mirror element; and
   a microphone assembly positioned to receive sound reflected from the second movable mirror element to determine a direction of the sound.

2. The apparatus of claim 1, wherein the first mirror element is a stationary mirror element.

3. The apparatus of claim 2, wherein the second movable mirror element and the first mirror element are foldably connected to one another.

4. The apparatus of claim 1, wherein the sound reflector has, in at least one direction of extent, a dimension of at least five times a sound wavelength of at least 3000 Hertz.

5. The apparatus of claim 1, wherein the microphone assembly has a plurality of microphones.

6. The apparatus of claim 1, wherein the microphone assembly is a micro-electric-mechanical system (MEMS) microphone assembly.

7. The apparatus of claim 1 wherein the second movable mirror element is rotated about a pivot axis relative to the first mirror element from the first position to the second position, wherein the second movable mirror element is connected to the first movable mirror element along the pivot axis.

8. The apparatus of claim 1 wherein the first mirror element and second movable mirror element are formed from a foldable mirror sheet.

9. A motor vehicle comprising:
   a blind spot assistant apparatus having:
      a mirror assembly with a first mirror element moveable relative to a second mirror element, the first mirror element forming a sound reflector,
      an actuator to move the first mirror element, and
      a microphone assembly having first and second microphones positioned to receive sound emitted by a road user and reflected from the first mirror element to determine a direction of the sound.

10. The motor vehicle of claim 9 further comprising a controller configured to receive signals from the first and second microphones, and determine the sound direction using a measurement of a sound propagation time difference between sound received by the first and second microphones.

11. The motor vehicle of claim 10 further comprising a turn signaling device;
   wherein the controller is configured to control the actuator to move the first mirror element in response to the turn signaling device being activated by a user.

12. The motor vehicle of claim 10 wherein the controller is further configured to output a warning signal to alert a user in response to the sound direction being indicative of the road user being in a blind spot of the vehicle.

13. The motor vehicle of claim 9 wherein the first mirror element is movable from a first position to a second position, wherein the first mirror element and the second mirror element form a co-planar mirror surface with the first mirror element in the first position.

14. The motor vehicle of claim 13 wherein the first mirror element is rotated about a pivot axis relative to the second mirror element from the first position to the second position.

15. The motor vehicle of claim 14 wherein the second mirror element is positioned between a driver of the vehicle and the first mirror element.

16. The motor vehicle of claim 14 wherein the first mirror element is connected to the second mirror element along the pivot axis.

17. The motor vehicle of claim 9 wherein the first mirror element and second mirror element are formed from a foldable mirror sheet.

18. The motor vehicle of claim 9 wherein the microphone assembly is a micro-electric-mechanical system (MEMS) microphone assembly.

19. The motor vehicle of claim 9 wherein the sound reflector of the first mirror element has a dimension of at least five times a sound wavelength of 5000 Hertz.

20. The motor vehicle of claim 9 wherein the first and second microphones are each omnidirectional microphones.

* * * * *